Dec. 10, 1957  H. C. HARBERS ET AL  2,815,980
DUMP TRUCK
Filed Sept. 13, 1954  4 Sheets-Sheet 1
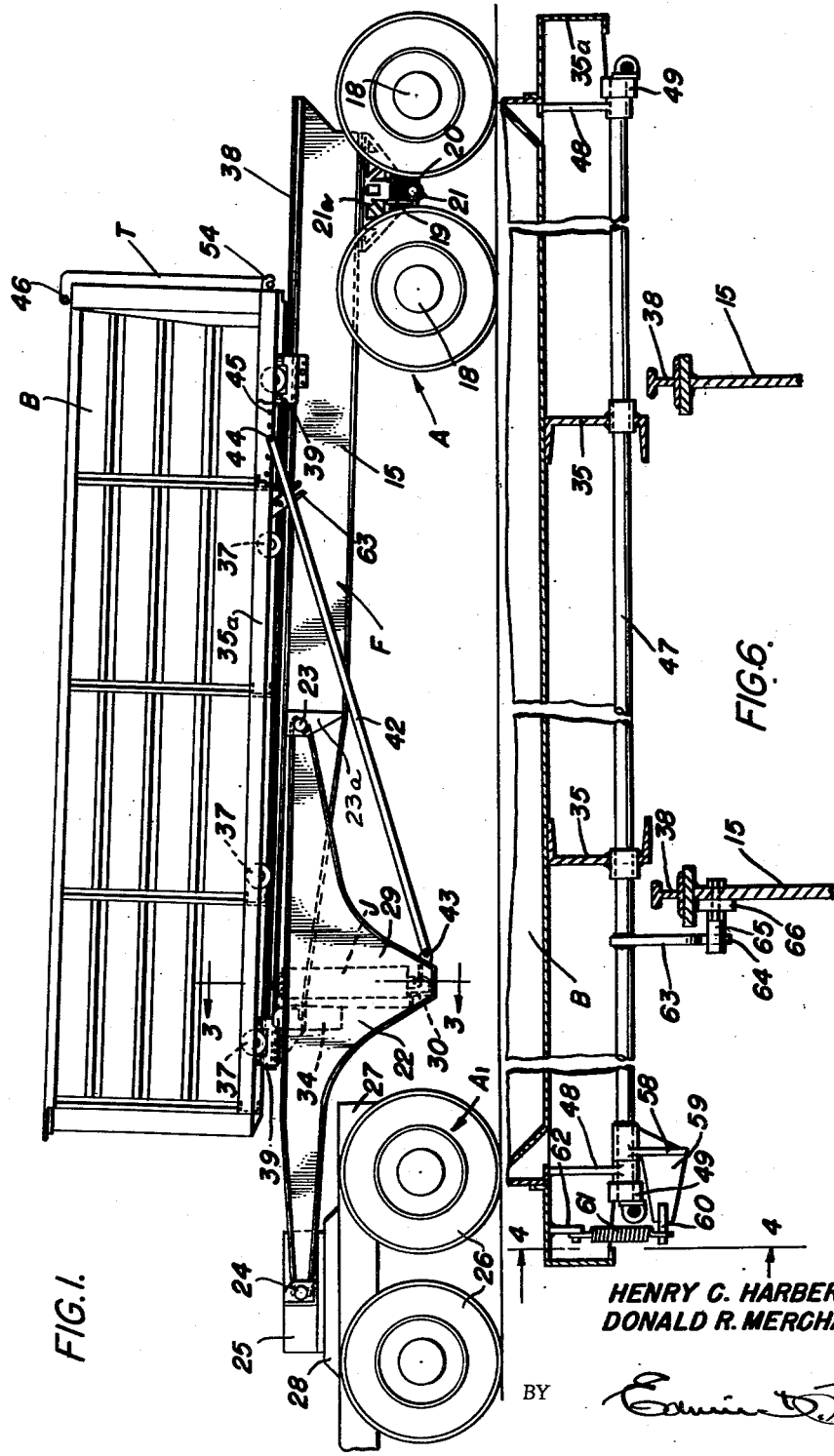
INVENTOR
HENRY C. HARBERS
DONALD R. MERCHANT
BY
ATTORNEY

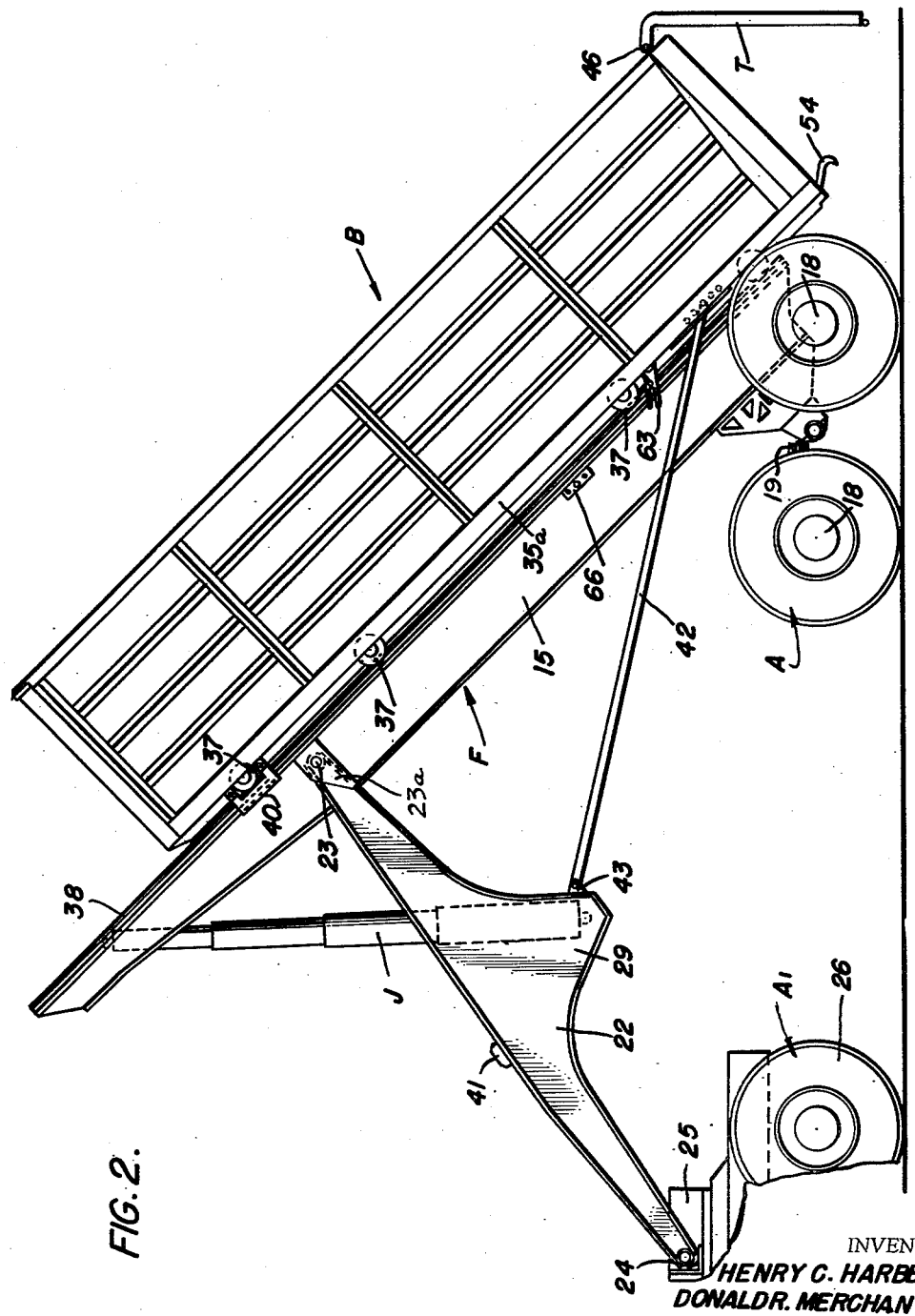

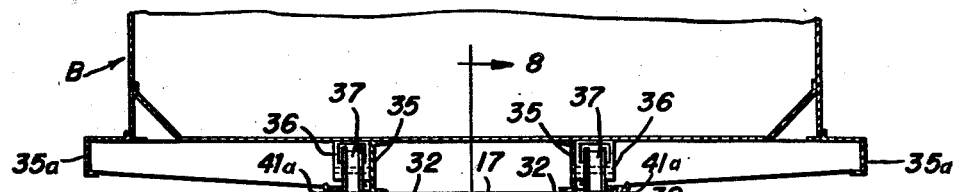
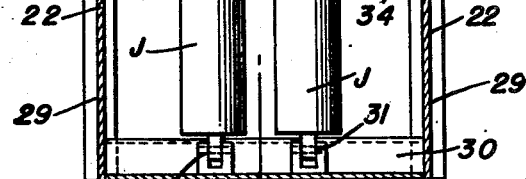
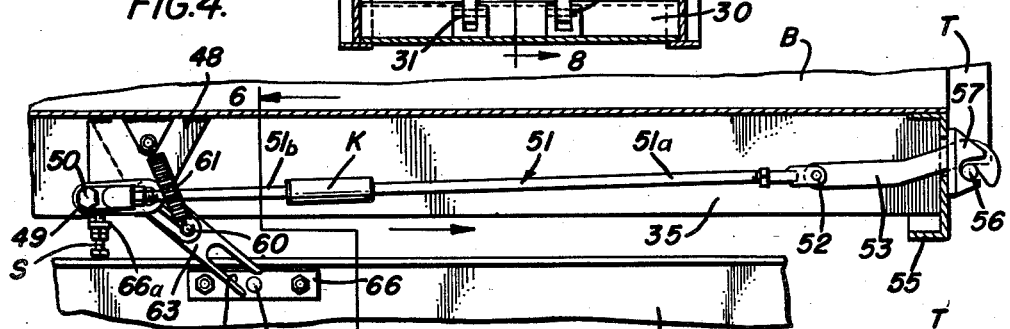
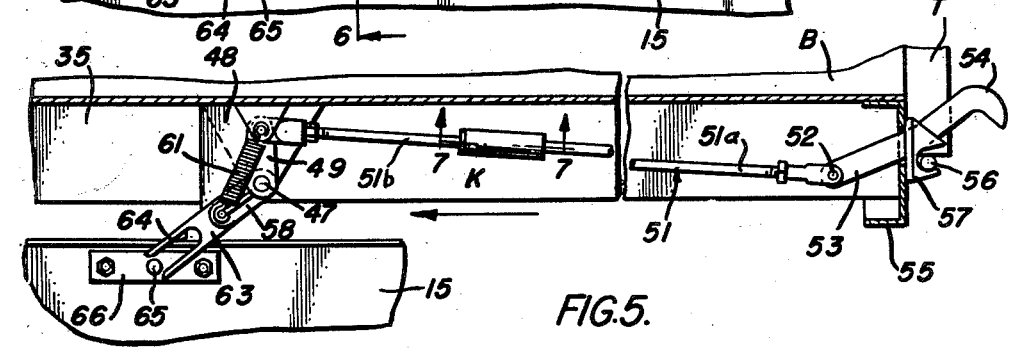
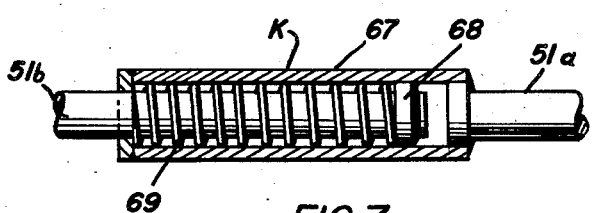
INVENTOR
HENRY C. HARBERS
DONALD R. MERCHANT Dec. 10, 1957 H. C. HARBERS ET AL 2,815,980
DUMP TRUCK
Filed Sept. 13, 1954 4 Sheets-Sheet 4

INVENTOR
HENRY C. HARBERS
DONALD R. MERCHANT

BY

ATTORNEY

United States Patent Office 2,815,980
Patented Dec. 10, 1957

2,815,980

DUMP TRUCK

Henry C. Harbers, Pasadena, and Donald R. Merchant, Glendale, Calif., assignors to Cook Bros. Equipment Co., Los Angeles, Calif., a corporation of California Application September 13, 1954, Serial No. 455,718

12 Claims. (Cl. 298—14)

Our invention relates to dump trucks of the semi-trailer type, and of the character disclosed in our co-pending application Serial No. 445,296, filed July 23, 1954, wherein is embodied a power-driven vehicle including a front wheel assembly, and a semi-trailer including a rear wheel assembly, the two assemblies normally supporting a dump body in load-carrying position, and a semi-trailer having a supporting frame to which the dump body is fixed but which is separate from the front wheel assembly and mounted on the rear wheel assembly for upward and rearward swinging movement to elevate the body to dumping position, and a hoisting mechanism operable to so swing the frame by effecting relative approaching movement of the wheel assemblies.

It is a purpose of our present invention to provide a dump truck in which the dump body is mounted for rolling movement longitudinally on the supporting frame of the trailer so that when the frame is swung upwardly and rearwardly by a hoisting mechanism, the body simultaneously rolls rearwardly downward on the frame to a dumping position. Thus the height of the center of gravity of the dump body from the ground during the hoisting operation does not rise to as high a position as that of a dump body which is fixed to the supporting frame, and therefore greater stability is attained to minimize the possibility of overturning during a dumping operation. Moreover, by maintaining a lower center of gravity less power is required by the hoisting mechanism to elevate a loaded body to dumping position.

It is also a purpose of our invention to provide a dump truck in which the dump body is relatively short as compared to the length of the trailer, made possible by mounting the dump body for rolling movement on the supporting frame of the trailer. Since the trailer is longer than the dump body, the overall wheel base of the truck, that is, the distance from the front axle of the truck to the rear axle of the trailer, makes it possible to classify the vehicle in a higher gross vehicle weight rating in accordance with local and State load restrictions, and, as a consequence, a greater pay load can be carried. Moreover, through use of a dump body relatively short as compared to the length of the trailer the stability of the truck when the dump body is elevated is furthered.

Another purpose of our invention is the provision of a semi-trailer dump truck of this character having a control means which functions to initiate rearward rolling movement of the dump body as the supporting frame of the trailer is hoisted to elevated position, to control movement of the body during this dumping operation, and to return the body to its original position on the supporting frame when the latter is lowered. Adjusting means is provided for this control means by which it is possible to locate the body on the supporting frame to attain proper load distribution on the truck axles and thus comply with the highway axle loading restrictions. It also governs the height of the rear edge of the body when in dumping position, as well as its clearance with respect to the tires of the rear wheel assembly.

It is a further purpose of our invention to provide in a dump truck of this type latching mechanism for the tail gate of the dump body which is operable to latch or release the tail gate according as the dump body is moved on the supporting frame to load-carrying position or load-dumping position.

We will describe only one form of dump truck embodying our invention, including one form of tail gate latch and releasing mechanism, and will then point out the novel features thereof in claims.

In the accompanying drawings:

Fig. 1 is a view showing in side elevation one form of dump truck embodying our invention wherein the dump body is in load-carrying position.

Fig. 2 is a view similar to Fig. 1 showing the dump truck in dumping position.

Fig. 3 is an enlarged vertical sectional view taken on the line 3—3 of Fig. 1.

Fig. 4 is an enlarged sectional view taken on the line 4—4 of Fig. 6 and showing the tail gate latching and releasing mechanism in its movement to gate releasing position.

Fig. 5 is a view similar to Fig. 4 showing the mechanism in its movement from gate releasing position.

Fig. 6 is an enlarged vertical sectional view taken on the line 6—6 of Fig. 4.

Fig. 7 is an enlarged sectional view taken on the line 7—7 of Fig. 5.

Figure 8:
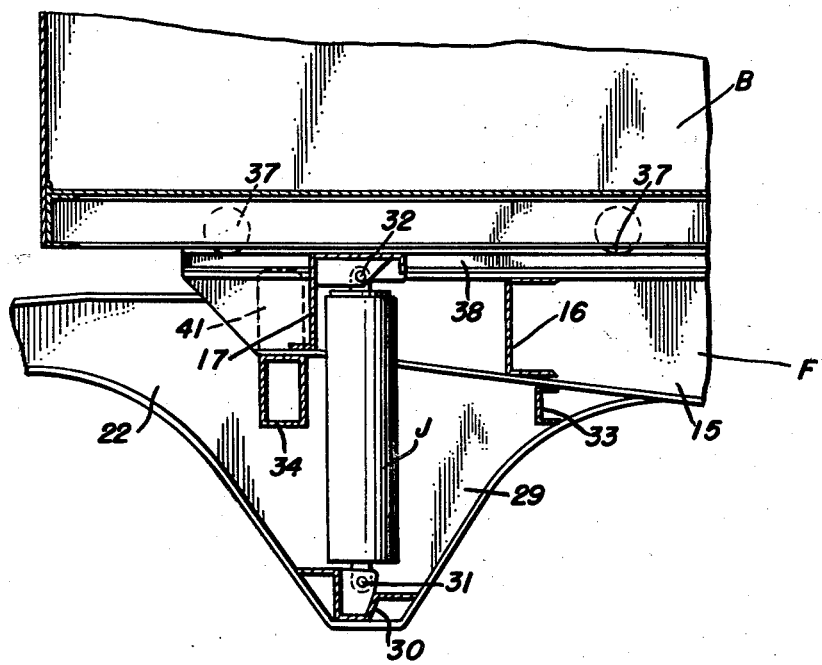
Fig. 8 is a vertical sectional view taken on the line 8—8 of Fig. 3.

Referring more particularly to the drawings, the dump truck comprises a rigid frame F including parallel side beams 15 connected together at longitudinally spaced points by cross beams 16, and adjacent their forward ends by an additional cross beam 17 of substantially S-form in cross section. Adjacent its rear end the frame F is supported by a rear wheel assembly A which is of the tandem axle type, the two axles 18 of which support the ends of springs 19, with the springs carrying depending bearings 20 in which trunnions 21 are mounted. The trunnions are fixed to members 21a secured to the undersides of the beams 15. This arrangement of elements provides pivotal connection between the frame and the rear wheel assembly so that the frame may tilt upwardly and rearwardly about the trunnions 21 as a center.

Constituting a draft and lifting means for the frame F are a pair of heavy duty links 22 which are pivoted at their rear ends on trunnions 23 mounted in brackets 23a fixed to the outer sides of the beams 15 between the ends thereof. These links 22 project forwardly beyond the forward ends of the beams 15 in any position of the two. At their forward ends the links 22 are pivoted on trunnions 24 which project from opposite sides of a conventional form of fifth wheel 25 supported by a front wheel assembly A-1 which includes tandem axle rear wheels 26, side frames 27 and a cross plate 28. This front wheel assembly is preferably the rear portion of a self-powered vehicle commonly used in connection with semi-trailers such as is formed by the rear wheel assembly A and the frame F.

The links 22, between the ends thereof, are formed with depending extensions 29 which constitute wells connected at the bottoms thereof by a cross beam 30. To this cross beam a pair of hydraulic jacks J of the multiple telescopic type are pivoted at their lower ends as at 31, while their upper ends are pivotally connected as at 32 to the cross beam 17. These jacks constitute means for hoisting the frame F to the elevated position shown in Fig. 2, but it is to be understood that other means than the jacks could be provided for the purpose.

The draft links 22 are additionally rigidly connected one to the other by cross beams 33, and a box beam 34 upon which latter the forward ends of the side beams 15 rest when the frame F is in the lowered position shown in Fig. 1.

Supported for rolling movement longitudinally on the frame F is a dump body B which includes a pair of parallel beams 35 fixed to the under side of the bottom of the body between side beams 35a. To the beams 35 frames 36 are secured at spaced intervals along the length thereof, and in each of which is journalled a flanged roller 37. These rollers are movable on a track made up of a pair of rails 38 fixed to the top of the side beams 15 and coextensive in length therewith.

Figure 9:
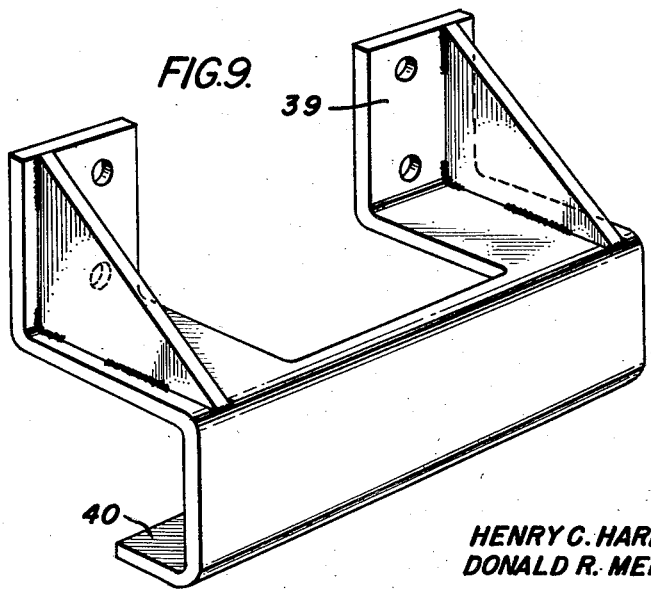
Fig. 9 is an enlarged detailed perspective view of one of the coupling brackets shown in Fig. 1.

The rollers 37 are confined to rolling movement on the rails by brackets 39 bolted to the outer sides of the beams 35 and arranged in pairs adjacent the opposite ends thereof. Each bracket is of the U-form shown in Fig. 9, to accommodate the respective roller 37 between the parallel portions thereof, and is formed with a depending inturned L-shaped lip 40 which extends to the under side of the upper flange edge of the respective side beam 15 with which it has sliding contact, and whereby the roller is at all times held in rolling contact with the respective rail.

To aid in transverse centering of the frame F on the links 22 as it is moved to lowered position, a pair of guide plates 41 are fixed to the confronting sides of the links so as to extend thereabove where they are formed with outwardly flared lips 41a. As the frame F is moved to the lowered position shown in Fig. 1 the lips 41a are engaged by the brackets 39 thus causing them to be guided between the plates and thereby centering the frame on the links. It will be understood that this does not interfere with elevation of the frame F since the brackets can slide out of engagement with the plates.

For controlling movement of the dump body B on the frame F as the latter is elevated to tilted position, as well as to return the dump body to a substantially medial position with respect to the overall length of the truck, and to a fore position on the frame F, a pair of control links 42 are pivoted at their forward ends to the draft links 22 at the rear side of the wells 29 as indicated at 43. The rear ends of these links 42 are pivoted to the side beams 35a of the dump body by pins 44 engageable within any one of a series of openings 45 in the side beams so as to make such pivotal connection adjustable lengthwise with respect to the dump body. The purpose of this adjustable connection is to predetermine the limits of movements of the dump body B on the frame F in both directions, and thus the position of the dump body on the frame when the latter is lowered or elevated can be controlled. Moreover, the control links 42, under movement of the draft links 22, are operable to initiate downward rolling movement of the dump body as the frame F is lifted to elevated position.

The dump body B is provided at its rear end with a tail gate T pivoted at its upper end as at 46 so as to gravitate to open or closed position according as the body occupies tilted position or a substantially horizontal position. To automatically latch the gate T in closed position, as well as to automatically release the gate so that material may be discharged from the body when tilted, a latching mechanism is provided.

This latching mechanism comprises, in the present instance, a shaft 47 journalled in the beams 35 (see Fig. 6) and in hangers 48 secured to the body B. To opposite ends of the shaft 47 crank arms 49 are fixed, and pivoted as at 50 to these arms are the forward ends of a pair of rods 51. The rear ends of the rods are pivotally connected as at 52 to shanks 53 of latch hooks 54, and the shanks are movable lengthwise through suitable openings in an end beam 55 of the dump body so that the hooks project to the rear side thereof for movement into and out of engagement with pins 56 on opposite edges of the gate T to secure the pins in keepers 57 fixed to the beam, and thereby lock the gate in closed position, or to release the pins so that the gate can gravitate to open position.

On the left-hand end of the shaft 47 (as viewed in Fig. 6) and at the inner side of the adjacent hanger 48, is fixed an arm 58 provided with a lateral extension 59 having on its free end a pin 60. To this pin is connected the lower end of a coiled contractural spring 61 the lower end of such spring being connected to an ear 62 fixed to the adjacent beam 35a. The spring 61 is for the purpose of maintaining the latch hooks 54 in gate latching or releasing position once the latch mechanism is actuated to occupy the position shown in Fig. 4, or the position shown in Fig. 5.

This mechanism could be actuated manually by turning of the shaft 47, but it is preferred to actuate it automatically through movement of the body B longitudinally on the frame F. To this end the shaft 47 has fixed thereto a lever 63 provided with a slot 64 in its free ends. A pin 65 fixed to a plate 66 bolted to the outer side of one of the beams 15 is positioned lengthwise of the beam so that the slotted end of the lever will engage the pin under movement of the body B on the frame F to swing the lever to the angular position shown in Fig. 4 when the body moves rearwardly on the frame, or to the opposite angular position shown in Fig. 5 when the body is moved forwardly on the frame. In this angular position of the lever it is to one side or the other of vertical dead center, and since the lever and the arms 58 are fixed to the shaft 47 at the same point circumferentially thereof, the springs 61 operate to maintain the lever in either angular position once it is moved to the right or to the left of dead center.

To insure lever 63 engaging pin 65 to properly operate the latching mechanism, its angle, when the mechanism is in the position shown in Fig. 4, can be varied by an adjustable stop S in the form of a screw threaded in an ear 66a on that hanger 48 adjacent the lever, and which screw is positioned to limit movement of the arm 49 in a counter-clockwise direction, and hence the angle of the lever.

In order to insure proper operation of the latching mechanism and yet prevent breakage of any of its parts due to improper mounting or adjustment particularly in moving the rods 51 to the position shown in Fig. 4, each rod is made in two sections 51a and 51b connected at their confronting ends by a yieldable coupling K. This coupling comprises a cylinder 67 closed and secured at one end to the rod section 51a. The confronting end of the rod section 51b is slidably received in the cylinder and provided with a head 68 for centering it therein. A coiled expansible spring 69 surrounds the rod section 51b between the head 68 and one end of the cylinder, which operates to urge the confronting ends of the rod sections toward each other.

With the rod sections connected by this yieldable coupling K, it is apparent that the two sections are movable relatively to compensate for any improper adjustment of the mechanism, and yet insure movement of the rods to either of the two extreme positions for latching or releasing the tail gate.

The operation of the dump truck is as follows:

In the load-carrying position of the truck shown in Fig. 1, the body B occupies a position forwardly on the frame F where it is held against movement by the control links 42 through the draft links 22. The tail gate T is secured in closed position by the latch hooks 54 since the mechanism for operating the latter is in the position shown in Fig. 4.

To dump the load from the body B the jacks J are operated by supplying fluid under pressure thereto from any suitable source (not shown) and through lines and valves of the character disclosed in our application hereinbefore referred to. Under such operation the jacks are extended upwardly to exert a lifting force on the draft links 22, and since the rear wheel assembly A is separate from the front wheel assembly A1, the two assemblies under such lifting force are caused to approach each other. This allows the frame F and the links 22 to buckle upward relatively so that under continued extension of the jacks the frame and the included body B are swung upwardly and rearwardly about the trunnions 21 to the position shown in Fig. 2.

During this operation the control links 42 function to initiate downward rolling movement of the body B on the frame F as well as to limit such body movement to the aft position shown in Fig. 2, wherein its lower end is disposed to the rear of the rear wheels of the assembly A. As the body approaches this aft position the levers 63 are swung by the pins 65 from the position shown in Fig. 4 to the position shown in Fig. 5, thereby causing the latching mechanism to move the latch hooks 54 out of engagement with the gate pins 56 to release the gate T and, thus allow the material to be dumped from the body.

Through adjustment of the pins 44 in the openings 45, the control links can be caused to regulate the height of the dumping end of the body B from the ground, as well as its position at the rear of the wheel assembly A to insure tire clearance.

Following the aforedescribed dumping operation the truck parts can be restored to the original positions shown in Fig. 1 by relieving the jacks J of pressure fluid which permits them to collapse, and by which the draft links 22, under the weight of the frame F and the body B, will be forced downward causing the two wheel assemblies A and A1 to move away from each other and back to their original spaced position.

During this operation the control links 42 are actuated to pull and thus move the body B forwardly on the frame F and back to its original position. As the body moves to load-carrying position gravity acts to close the gate T following which the levers 63 are swung by the pins 65 to the position shown in Fig. 5, thereby operating the latch mechanism to move the latch hooks 54 so as to reengage the gate pins 56 and thus secure the gate in closed position.

As clearly illustrated in Fig. 1, the dump body B is considerably shorter than the combined length of the draft links 22 and the frame F which actually constitute the trailer of the vehicle, and hence the body can be located midway between the ends of the trailer to attain proper load distribution on the axles. This is made possible by the fact that the body is movable lengthwise on the frame F, coupled with the adjustable connection of the control links 42 with the frame beams 15 to locate the body on the trailer when in load-carrying position. Since the trailer can be much longer than the body, the overall wheel base of the truck as a unit makes it possible to classify the vehicle in a higher gross vehicle weight rating in accordance with local and state restrictions, and consequently a greater pay load is achieved.

Because the dump body rolls rearwardly as it is elevated by the frame F in a dumping operation, it does not rise to as high a position as the center of gravity of a fixed body does, and thus by maintaining a low center of gravity less hydraulic pressure is required to be supplied to the jacks J for elevating the loaded body. Moreover, because of this low center of gravity coupled with the shorter body, greater stability is attained.

What we claim is:

1. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft means connecting the front wheel assembly to the frame; mechanism connected between the frame and the draft means, and arranged to exert a lifting force on the frame thereby causing operation of the draft means to produce relative approaching movement of said wheel assemblies whereby the frame is swung to said inclined position; a dump body supported for movement longitudinally on the frame to occupy a fore substantially horizontal position when the frame is in a corresponding position, and an aft position when the frame is in the aforesaid inclined position; and means connected between the draft means and the dump body and operating under approaching movement of said wheel assemblies to limit the dump body to a predetermined aft position, and operating under movement of said wheel assemblies away from each other to restore the dump body to said fore position.

2. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft means connecting the front wheel assembly to the frame; hydraulic mechanism connected between the frame and the draft means, and arranged to exert a lifting force on the frame thereby causing operation of the draft means to produce relative approaching movement of said wheel assemblies whereby the frame is swung to said inclined position; a dump body supported for rolling movement longitudinally on the frame to occupy a fore substantially horizontal position when the frame is in a corresponding position, and an aft position when the frame is in the aforesaid inclined position; and means connected between the draft means and the dump body and operating under approaching movement of said wheel assemblies to limit the dump body to a predetermined aft position, and operating under movement of said wheel assemblies away from each other to restore the dump body to said fore position.

3. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft means connecting the front wheel assembly to the frame; hydraulic mechanism connected between the frame and the draft means, and arranged to exert a lifting force on the frame thereby causing operation of the draft means to produce relative approaching movement of said wheel assemblies whereby the frame is swung to said inclined position; a dump body supported for rolling movement longitudinally on the frame to occupy a fore substantially horizontal position when the frame is in a corresponding position, and an aft position when the frame is in the aforesaid inclined position, the dump body being shorter than the wheel base of the dump truck so that when it is in said fore position it is substantially midway between the axles of said wheel assemblies; and means connected between the draft means and the dump body and operating under approaching movement of said wheel assemblies to limit the dump body to a predetermined aft position, and operating under movement of said wheel assemblies away from each other to restore the dump body to said fore position.

4. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft links pivoted at their forward ends to the front wheel assembly and pivoted at their rear ends to the frame; a dump body supported for movement longitudinally on the frame to occupy a fore substantially horizontal position when the frame is in a corresponding position, and an aft position when the frame is in the aforesaid inclined position; a pair of hydraulic jacks pivoted at one of their ends to the frame and pivoted at their other ends to the draft links, said jacks operating to exert a lifting force on the frame thereby causing operation of the draft links to produce relative approaching movement of said wheel assemblies whereby the frame is swung to said inclined position; and control links pivoted at their forward ends to the draft links and at their rear ends to the dump body, the control links operating under approaching movement of said wheel assemblies to move and yet limit the dump body to a predetermined aft position, and operating under movement of said wheel assemblies away from each other to restore the dump body to said fore position.

5. A dump truck as embodied in claim 4 wherein means is provided for varying the point of connection of the rear ends of the control links longitudinally on the dump body to vary the fore and aft positions of the dump body on the frame.

6. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft links pivoted at their forward ends to the front wheel assembly and pivoted at their rear ends to the frame; a dump body supported for movement longitudinally on the frame to occupy a fore substantially horizontal position when the frame is in a corresponding position, and an aft position when the frame is in the aforesaid inclined position; a pair of hydraulic jacks pivoted at one of their ends to the frame and pivoted at their other ends to the draft links, said jacks operating to exert a lifting force on the frame thereby causing operation of the draft links to produce relative approaching movement of said wheel assemblies whereby the frame is swung to said inclined position; control links pivoted at their forward ends to the draft links and at their rear ends to the dump body, the control links operating under approaching movement of said wheel assemblies to move and yet limit the dump body to a predetermined aft position, and operating under movement of said wheel assemblies away from each other to restore the dump body to said fore position; a tail gate pivoted on the rear end of the dump body to occupy an open position or a closed position according as the dump body occupies the aft position or said forward position; latching means for the tail gate; and mechanism operable by movement of the dump body to the aft position for actuating the latching means to release the tail gate, and operable by movement of the dump body to said fore position for actuating the latching means to latch the tail gate.

7. In a dump truck having a rear wheel assembly; a frame pivoted on said assembly for vertical tilting movement from a substantially horizontal position to an upwardly and rearwardly inclined position; a dump body supported for rolling movement on the frame to occupy a fore position when the frame is in said horizontal position, and an aft position when the frame is in said inclined position; a first means for moving the frame to said inclined position; a second means operable by the first means for moving the dump body to said fore position or said aft position according as the frame occupies said horizontal position or said inclined position; a tail gate pivoted on the dump body to occupy an open position or a closed position according as the dump body occupies the aft position or the fore position; latch pins on said gate; keepers on the dump body; latch hooks movable on the dump body to occupy a gate latching position in which they secure said pins in the keepers, a gate releasing position in which they disengage said pins; members movable lengthwise on the dump body in one direction or the other for moving the latch hooks to gate latching or gate releasing position; a shaft mounted on the dump body for actuating the members; a lever fixed to the shaft; an abutment so fixed on the frame that with movement of the dump body to the aft position on the fore position the lever will be moved by the abutment to rotate the shaft in one direction or the other and thus actuate the members to move the latch hooks to gate releasing position or gate latching position and a spring associated with the shaft for urging the lever to one side or the other of a dead center position to maintain the latch hooks in latching or releasing position after once being moved thereto.

8. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft links pivoted at their forward ends to the front wheel assembly and pivoted at their rear ends to the frame; a dump body supported for movement longitudinally on the frame to occupy a fore substantially horizontal position when the frame is in a corresponding position, and an aft position when the frame is in the aforesaid inclined position; mechanism connected between the frame and the draft links, and arranged to exert a lifting force on the frame thereby causing operation of the draft links to produce relative approaching movement of said wheel assemblies whereby the frame is swung to said inclined position; and control links pivoted at their forward ends to the draft links and at their rear ends to the dump body, the control links operating under approaching movement of said wheel assemblies to move and yet limit the dump body to a predetermined aft position, and operating under movement of said wheel assemblies away from each other to restore the dump body to said fore position.

9. A dump truck as embodied in claim 8, wherein means is provided by which the control links are adjustable in relation to the dump body so as to vary the fore and aft positions of the dump body on the frame.

10. A dump truck, including: a front wheel assembly; a rear wheel assembly; a frame separate from the front wheel assembly and pivoted on the rear wheel assembly for vertical tilting movement from a substantially horizontal position to an upwardly and rearwardly inclined position; draft links pivoted at their forward ends to the front wheel assembly and pivoted at their rear ends to the frame; a dump body supported for movement longitudinally on the frame to occupy a fore substantially horizontal position when the frame is in a corresponding position, and an aft position when the frame is in the aforesaid inclined position; mechanism connected between the frame and the draft links, and arranged to exert a lifting force on the frame thereby causing operation of the draft links to produce relative approaching movement of said wheel assemblies whereby the frame is swung to said inclined position; control links pivoted at their forward ends to the draft links and at their rear ends to the dump body, the control links operating under approaching movement of said wheel assemblies to move and yet limit the dump body to a predetermined aft position, and operating under movement of said wheel assemblies away from each other to restore the dump body to said fore position; a tail gate pivoted on the rear end of the dump body to occupy an open position or a closed position according as the dump body occupies the aft position or said forward position; latching means for the tail gate; and mechanism operable by movement of the dump body to the aft position for actuating the latching means to release the tail gate, and operable by movement of the dump body to said fore position for actuating the latching means to latch the tail gate.

11. A dump truck as embodied in claim 1 wherein means is provided to so adjust the last-mentioned means that the fore and aft positions of the dump body on the frame can be varied.

12. In a dump truck as embodied in claim 7, wherein each member is in two sections; and a yieldable connection between said sections for urging them toward each other.

References Cited in the file of this patent

UNITED STATES PATENTS

| | | |
|---|---|---|
| 1,755,803 | Anthony | Apr. 22, 1930 |
| 1,883,472 | Barrett | Oct. 18, 1932 |
| 2,621,814 | Lisota | Dec. 16, 1952 |
| 2,628,126 | Black | Feb. 10, 1953 |
| 2,696,404 | Wallin | Dec. 7, 1954 |